(12) United States Patent
Kraft et al.

(10) Patent No.: US 11,668,636 B2
(45) Date of Patent: Jun. 6, 2023

(54) PARTICLE DENSITY SENSOR USING EVANESCENT WAVE OF WAVEGUIDE

(71) Applicants: ams AG, Premstaetten (AT); Technische Universität Graz, Graz (AT)

(72) Inventors: Jochen Kraft, Premstaetten (AT); Georg Röhrer, Premstaetten (AT); Fernando Jesus Castano Sanchez, Premstaetten (AT); Anderson Pires Singulani, Premstaetten (AT); Paul Maierhofer, Premstaetten (AT)

(73) Assignees: AMS AG, Premstaetten (AT); TECHNISCHE UNIVERSITÄT GRAZ, Graz (AT)

( * ) Notice: Subject to any disclaimer, the term of this patent is extended or adjusted under 35 U.S.C. 154(b) by 0 days.

(21) Appl. No.: 16/772,416

(22) PCT Filed: Dec. 13, 2018

(86) PCT No.: PCT/EP2018/084772
§ 371 (c)(1),
(2) Date: Jun. 12, 2020

(87) PCT Pub. No.: WO2019/115698
PCT Pub. Date: Jun. 20, 2019

(65) Prior Publication Data
US 2021/0072134 A1 Mar. 11, 2021

(30) Foreign Application Priority Data
Dec. 15, 2017 (EP) .................................. 17207761

(51) Int. Cl.
*G01N 15/06* (2006.01)
*G01N 15/00* (2006.01)

(52) U.S. Cl.
CPC ......... *G01N 15/06* (2013.01); *G01N 2015/03* (2013.01); *G01N 2015/0693* (2013.01)

(58) Field of Classification Search
CPC .......... G01N 15/06; G01N 2015/0026; G01N 2015/03; G01N 2015/0693; G01N 21/534
(Continued)

(56) References Cited

U.S. PATENT DOCUMENTS 9,453,791 B2 9/2016 Schreuder et al.
9,518,909 B2 12/2016 Nicoletti
(Continued)

FOREIGN PATENT DOCUMENTS

AT 12382 U1 4/2012
CA 2894459 A1 1/2014
(Continued)

OTHER PUBLICATIONS

Schrobenhauser, R. et al., "Detection of the mass of fine particulate matter using light scattering and inertial filtering in a miniaturized sensor setup", IOP Publishing, Meas. Sci. Technol. 25, (2014) 035103, pp. 1-10.
(Continued)

*Primary Examiner* — Tri T Ton
(74) *Attorney, Agent, or Firm* — MH2 Technology Law Group, LLP

(57) ABSTRACT

The particle sensor device comprises a substrate, a photodetector, a dielectric on or above the substrate, a source of electromagnetic radiation, and a through-substrate via in the substrate. The through-substrate via is exposed to the environment, in particular to ambient air. A waveguide is arranged in or above the dielectric so that the electromagnetic radiation emitted by the source of electromagnetic radiation is coupled into a portion of the waveguide. A further portion of the waveguide is opposite the photode-
(Continued)

tector, so that said portions of the waveguide are on different sides of the through-substrate via, and the waveguide traverses the through-substrate via.

16 Claims, 3 Drawing Sheets

(58) Field of Classification Search
USPC .................................. 356/335–343, 432–444
See application file for complete search history.

(56) References Cited

U.S. PATENT DOCUMENTS

| | | |
|---|---|---|
| 2004/0223151 A1 | 11/2004 | Petros et al. |
| 2007/0146701 A1 | 6/2007 | Kiesel et al. |
| 2011/0236266 A1 | 9/2011 | Uematsu et al. |
| 2011/0291025 A1 | 12/2011 | Fortin et al. |
| 2012/0170044 A1 | 7/2012 | Prabhakar et al. |
| 2012/0293797 A1 | 11/2012 | Braeckmans et al. |
| 2014/0319378 A1 | 10/2014 | Van Steenberge et al. |
| 2016/0077218 A1* | 3/2016 | Loi ........................ G01T 1/244 250/370.02 |
| 2016/0370282 A1* | 12/2016 | Zhan .................. G01N 15/1434 |

FOREIGN PATENT DOCUMENTS

| | | |
|---|---|---|
| CN | 103630466 A | 3/2014 |
| CN | 105466816 A | 4/2016 |
| JP | 2016197020 A | 11/2016 |
| WO | 2011085465 A1 | 7/2011 |
| WO | 2016/208176 A1 | 12/2016 |
| WO | 2016208176 A1 | 12/2016 |
| WO | 2017016888 A1 | 2/2017 |

OTHER PUBLICATIONS

European Patent Office, International Search Report for PCT/EP2018/084772 dated Mar. 14, 2019.
European Examination Report in corresponding EP Application No. 17207761.2 dated Dec. 17, 2021, 8 pages.
First Chinese Search Report issued in corresponding CN Application No. 201880072119.6 dated Feb. 11, 2023, 18 pages.
Dong, M. et al. "Integrated Virtual Impactor Enabled PM2.5 Sensor" IEEE Sensor Journal, vol. 17, No. 9, May 1, 2017, pp. 2814-2821.
Schrobenhauser, R. et al.: "Detection of the mass of fine particulate matter using light scattering an inertial filtering in a miniaturized sensor setup" IOP Publishing, Measurement Science and Technology 25 (2014) 035103 (10pp).

* cited by examiner

PARTICLE DENSITY SENSOR USING EVANESCENT WAVE OF WAVEGUIDE

The present disclosure relates to the detection of small airborne particles.

BACKGROUND OF THE INVENTION

A compact and readily available particle sensor device is desired to enable a quick and accessible check of airborne particles in the environment, especially particles having a diameter of 2.5 µm or less. Such particles interfere with the propagation of light and can be detected by their scattering effect on electromagnetic radiation that is emitted by a light source provided in an optical sensor device.

SUMMARY OF THE INVENTION

The particle sensor device comprises a substrate, a photodetector, a dielectric on or above the substrate, a source of electromagnetic radiation, and a through-substrate via in the substrate. The through-substrate via is exposed to the environment, in particular to ambient air. A waveguide is arranged in or above the dielectric. Electromagnetic radiation emitted by the source of electromagnetic radiation is coupled into a portion of the waveguide on one side of the through-substrate via. A further portion of the waveguide is arranged on the other side of the through-substrate via at a location opposite the photodetector, so that said portions are on different sides of the through-substrate via. The waveguide traverses the through-substrate via in between.

In an embodiment of the particle sensor device, the waveguide comprises a plurality of individual waveguides arranged in parallel and laterally with respect to one another, each of the individual waveguides traversing the through-substrate via.

In a further embodiment, the waveguide comprises a plurality of individual waveguides arranged in parallel and on different levels above the substrate, each of the individual waveguides traversing the through-substrate via.

In a further embodiment, the source of electromagnetic radiation is integrated in the substrate or in the dielectric. The source of electromagnetic radiation may especially be a vertical-cavity surface-emitting laser.

In a further embodiment, the photodetector is integrated in the substrate.

In a further embodiment, an integrated circuit is formed in the substrate, especially if the substrate comprises semiconductor material, and configured for an operation of the photodetector, especially for an evaluation of a detection of electromagnetic radiation by the photodetector.

In a further embodiment, a grating is arranged in the waveguide at the source of electromagnetic radiation, and a further grating is arranged in the waveguide at a location opposite the photodetector.

A further embodiment comprises a further through-substrate via in the substrate, a conduit connecting the through-substrate via and the further through-substrate via, and a plurality of individual waveguides forming the waveguide. The individual waveguides traverse the through-substrate via, the further through-substrate via, or both the through-substrate via and the further through-substrate via.

In a further embodiment, the through-substrate via and the further through-substrate via have different dimensions along directions of the individual waveguides.

A further embodiment comprises a further substrate and a duct in the further substrate. The substrate is arranged on the further substrate, and the duct prolongs the through-substrate via of the substrate.

A further embodiment comprises a housing with at least two separate openings. The substrate and the further substrate are arranged in the housing, so that the openings communicate with one another via the through-substrate via and the duct.

In a further embodiment, the through-substrate via and the duct are the only connection between the openings that is provided inside the housing.

A further embodiment comprises a fan or pump in the further substrate, the fan or pump being configured to generate a gas flow through the through-substrate via and the duct. The gas flow can especially be modulated by a geometry of the through-substrate via and by an operation of the fan or pump.

BRIEF DESCRIPTION OF THE DRAWINGS

The following is a detailed description of examples of the particle sensor device in conjunction with the appended figures.

DETAILED DESCRIPTION

The particle sensor device is configured to detect particles by the reduction of light intensity that is caused by an interaction with the particle. The interaction takes place between an adsorbed particle and the evanescent field of electromagnetic radiation conducted in a waveguide. The waveguide is arranged across one or several through-substrate vias (TSVs) of a substrate.

One way to tune the selectivity of the particle sensor device to the size of the particles that are to be detected is to adapt the density and width of the waveguides. For this purpose, a plurality of waveguides of suitable sizes may be arranged in a gridlike manner over an array of through-substrate vias, which may comprise the same size or different dimensions. The gas carrying the particles can be introduced in some or all of the through-substrate vias in a predetermined sequence, according to the requirements of individual applications.

Figure 1:
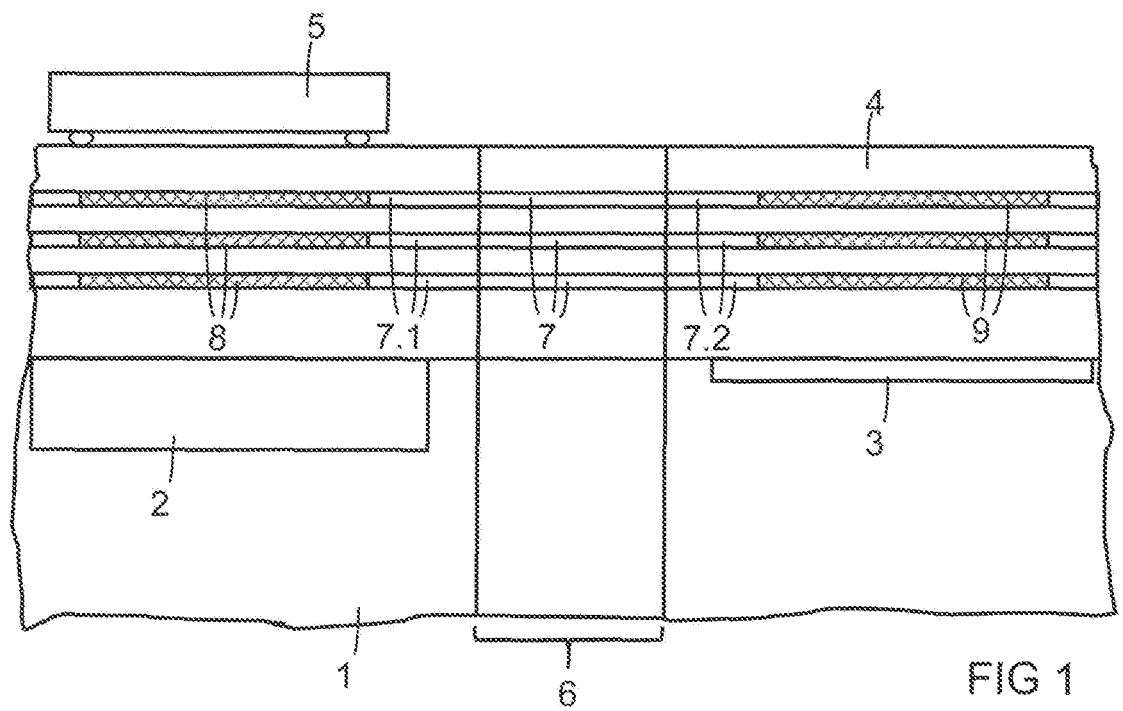
FIG. 1 is a cross section of a particle sensor device.

FIG. 1 is a cross section of a particle sensor device. A substrate 1, which may comprise a glass or a semiconductor material, especially silicon, for instance, is provided with an open through-substrate via 6, which can be exposed to an environment, in particular to ambient air. If the substrate 1 comprises a semiconductor material, it may be provided with an integrated circuit 2, in particular a circuit that can be produced in a standard CMOS process, and the integrated circuit 2 can especially be configured to evaluate the measurements that are performed with the particle sensor device.

A photodetector 3 is provided. The photodetector 3 may especially be a photodiode, for instance. The photodetector 3 may be formed in the substrate 1, in particular as an integrated component, or it may be a separate component, which may be formed in or on a further substrate.

A dielectric 4, which may especially be an oxide of semiconductor material, is arranged on or above the substrate 1. Electric connections of the integrated circuit 2 and the photodetector 3 may be provided by a wiring embedded in the dielectric 4.

A source of electromagnetic radiation 5, which may be a vertical-cavity surface-emitting laser (VCSEL) or a light-emitting diode (LED), for example, is arranged in or near the dielectric 4. The source of electromagnetic radiation 5 may be a separate component, which may be formed in or on a further substrate, or it may be monolithically integrated in the substrate 1 or in the dielectric 4. The source of electromagnetic radiation 5 is provided for the emission of electromagnetic radiation, which may especially be visible light, for instance.

A waveguide 7 is arranged in or above the dielectric 4, so that the electromagnetic radiation from the source of electromagnetic radiation 5 is coupled into a portion of the waveguide 7. The coupling may be effected by butt coupling, for instance, or by a diffraction grating 8 arranged in the waveguide 7. A further portion of the waveguide 7 is arranged in a location opposite the photodetector 3. The portion and the further portion are on different sides of the through-substrate via 6, and the waveguide 7 traverses the through-substrate via 6.

The waveguide 7 may include a plurality of individual waveguides arranged in parallel, as indicated in FIG. 1 by way of example. The individual waveguides may be arranged on different levels above the substrate 1 and/or laterally with respect to one another.

After traversing the through-substrate via 6, the electromagnetic radiation is directed from the waveguide 7 towards the photodetector 3. For this purpose a further grating 9 may be arranged in the waveguide 7, but other means may also be applied to diffract or scatter the electromagnetic radiation out of the waveguide 7.

In each measurement by the particle sensor device, electromagnetic radiation from the source 5 is conducted by the waveguide 7 through the through-substrate via 6 and then detected by the photodetector 3. Thus a change of light intensity, which is due to an interaction between particles and the evanescent field around the waveguide 7, is detected and monitored. When a gas carrying particles is directed through the through-substrate via 6, one or more of the particles will be adsorbed on the waveguide 7 and thus change the intensity of the passing electromagnetic radiation. There are correlations between the change of light intensity and the adsorbed particles, as well as between the number of adsorbed particles and the density of particles in the gas.

Figure 2:
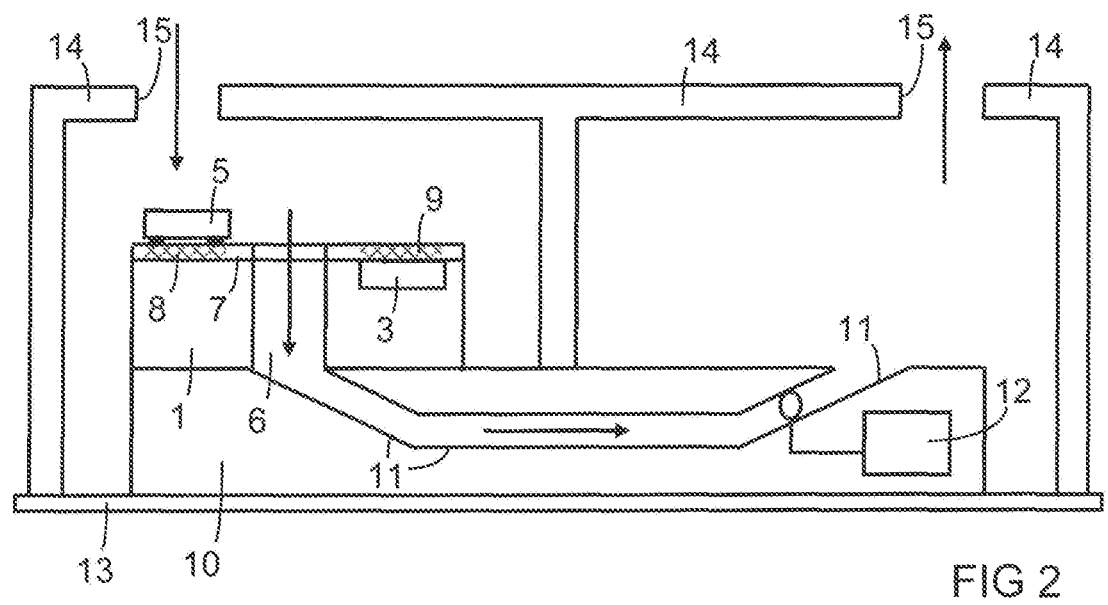
FIG. 2 is a cross section of an arrangement of a particle sensor device in a housing.

FIG. 2 is a cross section of an arrangement of a particle sensor device in a housing. Corresponding elements shown in FIGS. 1 and 2 are indicated with the same reference numerals. The arrangement according to FIG. 2 comprises a further substrate 10, which may especially be a silicon substrate or wafer, for instance. The substrate 1 is mounted on the further substrate 10. A duct 11 in the further substrate 10 prolongs the through-substrate via 6 of the substrate 1.

The substrate 1 and the further substrate 10 are arranged on a carrier 13 and in a housing 14 forming a package of the particle sensor device. At least two openings 15 are formed in the housing 14, which comprises compartments in such a manner that the openings 15 communicate with one another only via the through-substrate via 6 and the duct 11. Thus a gas entering the first opening 15, which is on the left in FIG. 2, passes the through-substrate via 6 and the duct 11 and leaves the inner volume of the housing 14 through the second opening 15, which is on the right in FIG. 2.

An optional fan or pump 12, which is schematically represented in FIG. 2, may be integrated in the further substrate 10 to generate and maintain a gas flow through the duct 11. The fan or pump 12 may instead be provided by a separate component. A suitable direction of the gas flow is indicated in FIG. 2 with arrows. The gas may instead flow in the reverse direction. In any case, the gas is forced to pass the waveguide 7 inside the through-substrate via 6.

Figure 3:
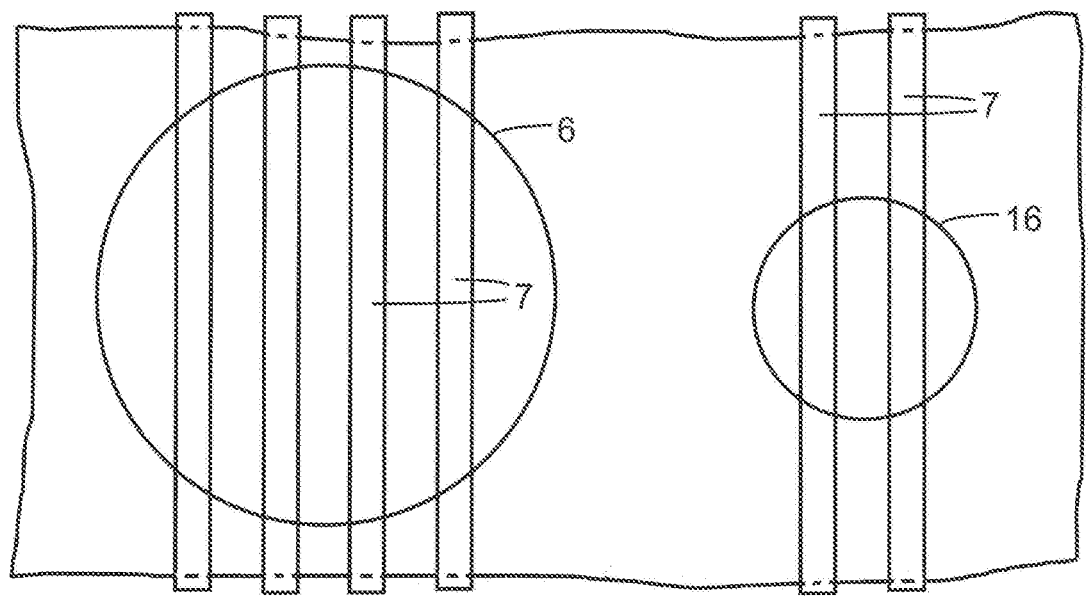
FIG. 3 is a schematic top view of an arrangement of through-substrate vias and waveguides.

FIG. 3 is a schematic top view of an arrangement of through-substrate vias and waveguides. The through-substrate vias 6, 16 are represented as cylindrical, but they may have any other suitable shape. In the example shown in FIG. 3, a further through-substrate via 16 is provided, which has a diameter that is smaller than the diameter of the through-substrate via 6. The waveguide 7 comprises individual waveguides parallel and lateral relative to one another.

Figure 4:
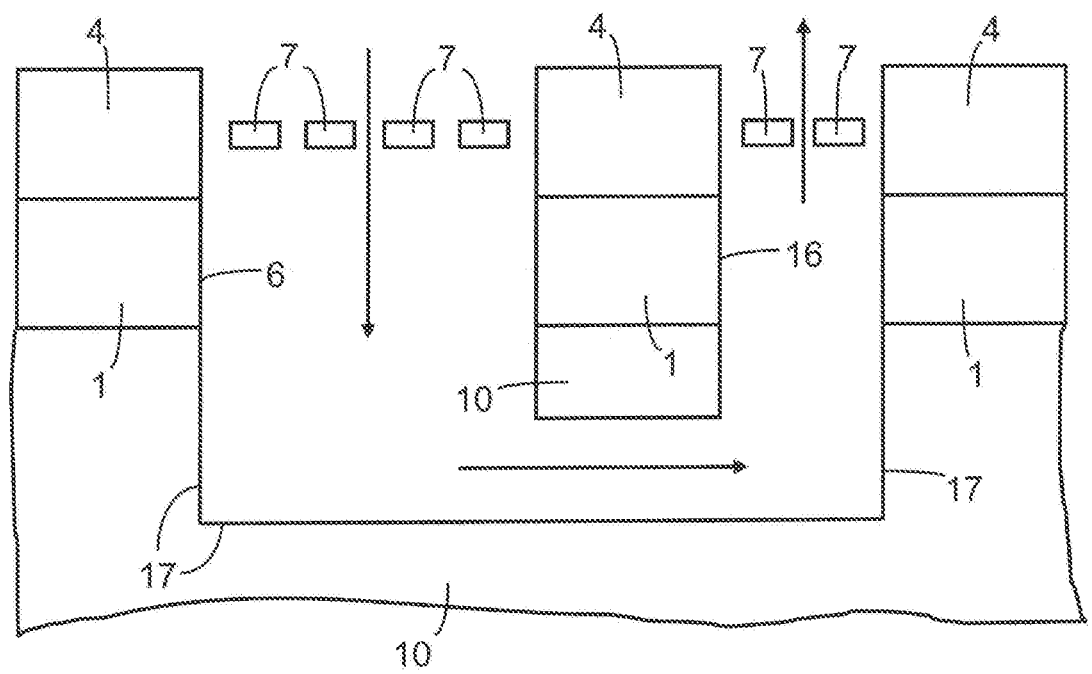
FIG. 4 is a cross section of a device comprising the arrangement according to FIG. 3.

FIG. 4 is a cross section of a device comprising the arrangement of through-substrate vias 6, 16 and waveguides 7 according to FIG. 3. Corresponding elements shown in FIGS. 2, 3 and 4 are indicated with the same reference numerals. A conduit 17 in the further substrate 10 forms a connection between the through-substrate via 6 and the further through-substrate via 16. When a gas has entered the through-substrate via 6, the conduit 17 allows the gas to flow to the further through-substrate via 16 and leave the substrate 1 according to the arrows inserted in FIG. 4. The gas may instead flow in the opposite direction.

Owing to the different dimensions of the vias, the velocity of the gas in the further through-substrate via 16 is greater than the velocity of the gas in the through-substrate via 6. The velocity of the gas determines the relation between the amount of larger and smaller particles that are trapped by the waveguide 7. Small particles are primarily trapped by the waveguide 7 inside the larger through-substrate via 6, while larger particles are primarily trapped inside the smaller further through-substrate via 16. This concept can be extended to particle sensor devices comprising a plurality of through-substrate vias of the same or different dimensions.

The density of the arrangement of individual waveguides and the size of the gaps between them also have an influence on the velocity of the gas. The individual waveguides may typically have a width of about 1 μm and a spacing between them that is in the range from 2.5 μm to 10 μm, for example.

Figure 5:
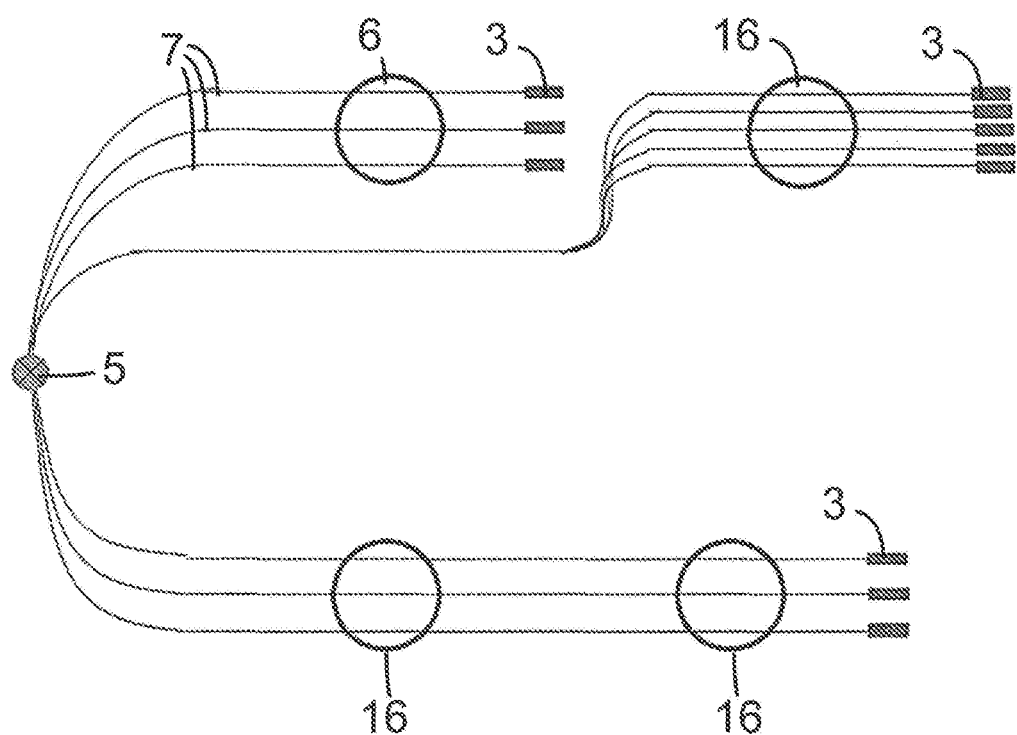
FIG. 5 is a schematic top view of an arrangement of a plurality of through-substrate vias and waveguides.

FIG. 5 shows a top view of an example of an arrangement of several through-substrate vias 6, 16 and individual waveguides 7. Every individual waveguide 7 is provided with a photodetector 3 for an increased signal-to-noise ratio. The required light intensity is reduced when the waveguide 7 crosses two or more through-substrate vias 6, 16, as in the example shown in FIG. 5.

The probability of adsorption is a function of the particle size, the velocity of the gas flow, and the pitch and width of the waveguide 7. The gas flow can especially be modulated by the geometry of the through-substrate via 6 and by the operation of the fan or pump 12. A smaller velocity of the gas assists the detection of smaller particles, whereas larger particles are mainly detected at a greater velocity.

Advantages of the describe particle sensor device are an enhanced integrability and a reduction of the required light intensity. As small airborne particles are prone to being adsorbed on the waveguide, only a comparatively small number of holes is required for the adsorption of a sufficient number of particles in order to achieve a high sensitivity. Hence the device can be realized on a chip of standard size.

The use of a waveguide enhances the scattering effect of particles that are small in relation to the wavelength of the electromagnetic radiation. The confinement of the waveguide reduces the probability of undesired scattering, which might otherwise increase the noise level, and increases the effect of the presence of particles on the radiation that is received by the photodetector.

The invention claimed is:

1. A particle sensor device, comprising:
   a substrate;
   a photodetector;
   a dielectric on or above the substrate;
   a source of electromagnetic radiation;
   a through-substrate via in the substrate;
   a waveguide comprising a first portion and a second portion, wherein the waveguide is arranged in or above the dielectric and the electromagnetic radiation from the source of electromagnetic radiation is coupled into the first portion of the waveguide;
   a first grating in the portion of the waveguide where the electromagnetic radiation is coupled into the waveguide;
   a second grating in the second portion of the waveguide opposite the photodetector;
   a further substrate, the substrate being arranged on the further substrate;
   a duct in the further substrate, the duct prolonging the through-substrate via;
   a housing with at least two separate openings, the substrate and the further substrate being arranged in the housing, the openings communicating with one another via the through-substrate via and the duct,
   wherein
   the second portion of the waveguide is arranged at the photodetector, and
   the through-substrate via is exposed to an environment and the waveguide traverses the through-substrate via at a location between the first portion and the second portion.

2. The particle sensor device according to claim 1, wherein the waveguide comprises a plurality of individual waveguides arranged in parallel and laterally with respect to one another, each of the individual waveguides traversing the through-substrate via.

3. The particle sensor device according to claim 1, wherein the waveguide comprises a plurality of individual waveguides arranged in parallel and on different levels above the substrate, each of the individual waveguides traversing the through-substrate via.

4. The particle sensor device according to claim 1, wherein the source of electromagnetic radiation is integrated in the substrate or in the dielectric.

5. The particle sensor device according to claim 1, wherein the source of electromagnetic radiation is a vertical-cavity surface-emitting laser.

6. The particle sensor device according to claim 1, wherein the photodetector is integrated in the substrate.

7. The particle sensor device according to claim 1, further comprising:
   an integrated circuit formed in the substrate, the integrated circuit being configured for an operation of the photodetector.

8. The particle sensor device according to claim 1, further comprising:
   a grating in the portion of the waveguide where the electromagnetic radiation is coupled into the waveguide, and
   a further grating in the further portion of the waveguide opposite the photodetector.

9. The particle sensor device according to claim 1, further comprising:
   a further through-substrate via in the substrate,
   a conduit connecting the through-substrate via and the further through-substrate via, and
   a plurality of individual waveguides forming the waveguide, the individual waveguides traversing the through-substrate via, the further through-substrate via, or both the through-substrate via and the further through-substrate via.

10. The particle sensor device according to claim 9, wherein the through-substrate via and the further through-substrate via have different dimensions along directions of the individual waveguides.

11. The particle sensor device according to claim 1, wherein the through-substrate via and the duct are the only connection between the openings inside the housing.

12. The particle sensor device according to claim 1, further comprising:
   a fan or pump in the further substrate, the fan or pump being configured to generate a gas flow through the through-substrate via and the duct.

13. The particle sensor device according to claim 12, wherein the gas flow is modulated by a geometry of the through-substrate via and by an operation of the fan or pump.

14. A particle sensor device, comprising:
   a substrate;
   a photodetector;
   a dielectric on or above the substrate;
   a source of electromagnetic radiation;
   a through-substrate via in the substrate; and
   a waveguide comprising a first portion, a second portion, and a material on which particles are adsorbed, wherein the waveguide is arranged in or above the dielectric and electromagnetic radiation from the source of electromagnetic radiation is coupled into the first portion of the waveguide,
   wherein
   the second portion of the waveguide is arranged at the photodetector, and
   the through-substrate via is exposed to an environment, the waveguide traverses the through-substrate via at a location between the first portion and the second portion, and the particles are absorbed on the waveguide inside the through-substrate via.

15. The particle sensor device according to claim 14, further comprising:
   a further substrate, the substrate being arranged on the further substrate, and
   a duct in the further substrate, the duct prolonging the through-substrate via.

16. The particle sensor device according to claim 15, further comprising:
   a housing with at least two separate openings, the substrate and the further substrate being arranged in the housing, the openings communicating with one another via the through-substrate via and the duct.

* * * * *

UNITED STATES PATENT AND TRADEMARK OFFICE
CERTIFICATE OF CORRECTION

| | |
|---|---|
| PATENT NO. | : 11,668,636 B2 |
| APPLICATION NO. | : 16/772416 |
| DATED | : June 6, 2023 |
| INVENTOR(S) | : Jochen Kraft et al. |

It is certified that error appears in the above-identified patent and that said Letters Patent is hereby corrected as shown below:

In the Claims

In Claim 14:
At Column 6, Line 50, "absorbed" should be --adsorbed--

Signed and Sealed this
Eighth Day of August, 2023

*Katherine Kelly Vidal*

Katherine Kelly Vidal
*Director of the United States Patent and Trademark Office*